(12) United States Patent
Im

(10) Patent No.: US 8,184,959 B2
(45) Date of Patent: May 22, 2012

(54) APPARATUS AND METHOD FOR RECORDING/REPRODUCING MOVING PICTURE IN DIGITAL BROADCAST RECEIVER

(75) Inventor: Jin Seok Im, Seoul (KR)

(73) Assignee: LG Electronics Inc., Seoul (KR)

( * ) Notice: Subject to any disclaimer, the term of this patent is extended or adjusted under 35 U.S.C. 154(b) by 1415 days.

(21) Appl. No.: 11/342,626

(22) Filed: Jan. 31, 2006

(65) Prior Publication Data

US 2006/0171666 A1 Aug. 3, 2006

(30) Foreign Application Priority Data

Feb. 1, 2005 (KR) .................. 10-2005-0009142

(51) Int. Cl.
*H04N 5/783* (2006.01)
(52) U.S. Cl. .................. 386/343; 386/344; 386/351
(58) Field of Classification Search .................. 386/46, 386/68, 94, 95
See application file for complete search history.

(56) References Cited

U.S. PATENT DOCUMENTS

| | | | |
|---|---|---|---|
| 5,859,949 A * | 1/1999 | Yanagihara | 386/314 |
| 6,222,981 B1 * | 4/2001 | Rijckaert | 386/68 |
| 6,389,218 B2 * | 5/2002 | Gordon et al. | 386/68 |
| 6,445,738 B1 * | 9/2002 | Zdepski et al. | 375/240.01 |
| 6,453,115 B1 * | 9/2002 | Boyle | 386/68 |
| 6,510,554 B1 * | 1/2003 | Gordon et al. | 725/90 |
| 6,529,555 B1 * | 3/2003 | Saunders et al. | 375/240.26 |
| 6,700,932 B2 * | 3/2004 | Shen et al. | 375/240.12 |
| 6,937,770 B1 * | 8/2005 | Oguz et al. | 382/235 |
| 6,970,640 B2 * | 11/2005 | Green et al. | 386/346 |
| 7,231,132 B1 * | 6/2007 | Davenport | 386/343 |
| 2008/0131072 A1 * | 6/2008 | Chang et al. | 386/52 |

FOREIGN PATENT DOCUMENTS

JP 2003333528 A * 11/2003

* cited by examiner

*Primary Examiner* — William C Vaughn, Jr.
*Assistant Examiner* — Gelek W Topgyal
(74) *Attorney, Agent, or Firm* — Birch, Stewart, Kolasch & Birch, LLP

(57) ABSTRACT

An apparatus and method for recording/playing a moving picture in a digital broadcast receiver is disclosed, which supports a trick mode. If digital broadcasting is recorded, the digital broadcasting is converted into a video sequence having a new format and frame type, such as an I frame structure, and then recorded in a recording medium. Also, corresponding I frame is directly uploaded and played in accordance with times speed of trick play using the frame index of video data recorded after being converted into the I frame. Thus, it is possible to normally provide more elaborate moving picture trick play for every times speed.

14 Claims, 4 Drawing Sheets

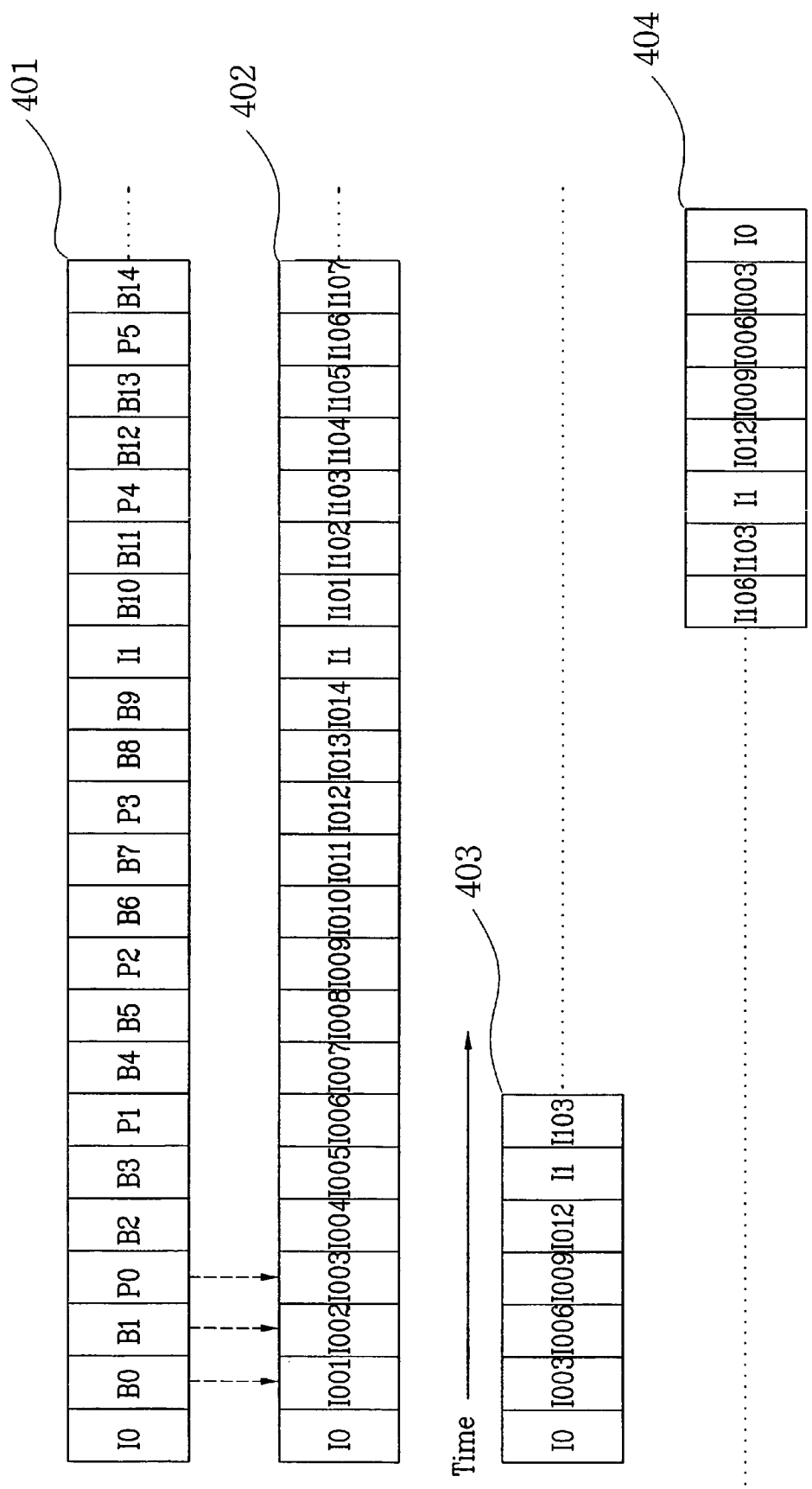

APPARATUS AND METHOD FOR RECORDING/REPRODUCING MOVING PICTURE IN DIGITAL BROADCAST RECEIVER

This application claims the benefit of Korean Application No. 10-2005-009142, filed on Feb. 1, 2005, which is hereby incorporated by reference as if fully set forth herein.

BACKGROUND OF THE INVENTION

1. Field of the Invention

The present invention relates to a digital broadcast receiver with a recording medium, and more particularly, to an apparatus and method for recording/playing a moving picture in a digital broadcast receiver, which supports a trick mode.

2. Discussion of the Related Art

One of digital TV application services, which are being widely spread, is a personal video recorder (PVR). The personal PVR is to provide viewers with additional convenient functions by employing a hard disk drive (HDD) having low cost and high capacity in a digital broadcast receiver. For example, if a viewer inputs a pause command to leave its seat for a while in the course of viewing a TV, a system inside the PVR records a broadcasting stream in the HDD from the time when the pause command is input, and plays the broadcasting stream from the time after a resume command is input. In this case, the recording operation and the reproducing operation are executed by a time difference corresponding to the time when the pause command is input.

The broadcasting stream recorded in the HDD is played in several trick modes. Examples of the trick modes include a slow play mode, a fast play mode, and a reverse play mode in addition to a normal play mode. For trick play, when the broadcasting stream is recorded, features of a video bit stream corresponding to each transport stream (TS) are extracted to generate related index data. Thus, the broadcasting stream is recorded along with the related index data. The broadcasting stream is played referring to the index data, so that various kinds of trick play that can fulfill the viewer's request can be provided.

Meanwhile, a data format of the moving picture expert group (MPEG) standard, which is used for compression and transmission of digital video, is divided into a program stream and a transport stream. The program stream is used to record digital video in a recording medium, which has little error in transmission. By contrast, the transport stream having a fixed packet length is used for digital broadcasting in which a transmission channel is relatively unstable. In other words, a system that transmits digital video through a transport packet of a constant unit can readily detect error and prevent error from being spread.

A general apparatus for recording/playing a transport stream extracts data required for play and records the data in a recording medium by inserting a time stamp. In this case, examples of the data required for play include a starting position of a frame, a type of a frame, an encoded frame rate, and a bit rate. Such data are used for trick play of high speed or low speed in accordance with an output mode.

Unlike an analog TV, a digital TV prevents noise and ghost from occurring by reducing a transmission error, thereby obtaining high sound quality and high picture quality. Also, the digital TV transmits data such as audio, video and text by efficiently compressing the data using an excellent digital compression technique. In this case, since the amount of the data required for one channel can be reduced, several channels can be transmitted to one channel of the existing TV. As a result, it is possible to provide various kinds of information through such multi-channels.

It is a general trend that such a digital TV of high quality is being substituted for an analog TV due to its fast speed and its various functions are being reflected on a digital TV receiver.

However, it is general that the digital TV has a function that receives analog broadcasting as well as digital broadcasting as far as the analog broadcasting continues to exist. A digital TV having a PVR function has no problem in recording and playing digital video data of the digital broadcasting. However, the digital TV additionally needs an MPEG encoder to provide such a PVR function in recording and playing the analog broadcasting, wherein the MPEG encoder converts analog data into recordable digital data.

A moving picture compression method of the MPEG encoder is based on a method for removing spatial redundancy and temporal redundancy. To remove the spatial redundancy, the MPEG encoder converts data of a pixel domain into data of a frequency domain and quantizes the data of the frequency domain. In this case, it is possible to remove high frequency components unsusceptible to eyesight and reduce the amount of data to be recorded.

To remove the temporal redundancy, the MPEG encoder uses motion prediction and compensation. In other words, the MPEG encoder searches for a portion having a pixel value, which is similar to a current video frame, from a reference video frame, so as to encode the searched portion using a motion vector and also encode the other differential value through frequency conversion.

Types of the video frame of the MPEG moving picture include Intra (I), Predictive (P), and Bi-predictive (B). The I frame does not require a reference frame and is a self-recoverable video frame. The P frame requires one reference frame first decoded. The B frame requires two reference frames first decoded.

Therefore, a frame sequence of the MPEG moving picture has a structure such as " . . . ,B,B,I,B,B,P,B,B,P,B,B, . . . ," wherein a frame from the I frame to the next I frame is called a group of picture (GOP) based on a transmission order. Supposing that the number of frames in the GOP is N and the number of frames between the I frame and the P frame or between the P frame and the P frame is M, N and M are variable in one sequence.

At this time, since the I frame is self-recoverable without a reference frame, error accumulation by motion compensation is removed so as to refresh a video decoder.

Trick play of the PVR fundamentally controls times speed based on the I frame.

FIG. 1 illustrates several examples of related art forward trick play. In other words, it is supposed that a video sequence having a GOP structure, in which the number of frames from the I frame to the next I frame is fifteen as shown in 101, is recorded in an HDD.

In this case, for forward trick play of fifteen times speed, only the I frame is simply read from the HDD as shown in 102. The I frame is input to a video decoder in forward direction in accordance with a frame rate to recover the I frame. Then, if the recovered I frame is displayed, it is possible to play the I frame at fifteen times speed.

In this case, the size of a video buffering verifier (VBV) memory that stores video bit streams is additionally required unlike a normal play video stream. This is because that the VBV memory decodes only the I frame and thus remarkably increases the whole bit rate in comparison with the video sequence that additionally includes P and R frames.

In the GOP structure shown in 101, for trick play of three times speed, the I and P frames excluding the B frame are read from the HDD as shown in 103 and then decoded in forward direction in accordance with the frame rate. In this case, it is possible to play the frames at three times speed.

In the GOP structure shown in 101, for trick play of two times speed, one frame is skipped and a corresponding frame is decoded as shown in 104. In this case, since a reference frame may not be decoded, perfect video may not be recovered. For example, to decode a B1 frame of 104, I0 and P0 reference frames are required. However, since the P0 frame is not decoded, the B1 frame cannot be recorded normally.

Therefore, in the related art, trick play of two times speed is provided for decoding as shown in 105. However, in 105, a corresponding frame is decoded and displayed to obtain two times speed effect while one or two video frames are skipped. In this case, instead of a moving picture of two times speed, abnormal moving picture may be played.

Furthermore, in case where the moving picture is played in reverse direction in the related art, such abnormal trick play occurs more seriously.

FIG. 2 illustrates several examples of related art reverse trick play. For a video sequence having a GOP structure shown in 201, reverse trick play of fifteen times speed is simply provided as shown in 202.

However, in the GOP structure shown in 201, trick play of times speed other than fifteen times speed actually makes normal reverse play impossible.

In case of reverse trick play in the related art, only I frame that can be decoded in reverse direction is read from the HDD and then decoded. Then, the I frame is repeatedly played and stopped in accordance with each times speed and frame rate. In other words, trick play effect is obtained as upload is controlled in accordance with corresponding times speed as shown in 203 or 204. As a result, reverse trick play that causes abnormal interconnection between frames is provided.

SUMMARY OF THE INVENTION

Accordingly, the present invention is directed to an apparatus and method for recording/playing a moving picture in a digital broadcast receiver, which substantially obviates one or more problems due to limitations and disadvantages of the related art.

An object of the present invention is to provide an apparatus and method for recording/playing a moving picture in a digital broadcast receiver, in which digital moving picture is converted into a video sequence having a new format and frame type using an MPEG encoder, which converts moving picture of analog broadcasting into digital moving picture to record the digital moving video in a recording medium, and the video sequence is recorded in the recording medium, whereby normal trick play is provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for recording/playing a moving picture in a digital broadcast receiver includes an analog tuner receiving analog broadcasting and digitalizing the analog broadcasting, a digital tuner receiving digital broadcasting, a recording medium recording analog broadcasting signals or digital broadcasting signals, an MPEG encoder encoding the digitalized analog signals in an MPEG compression manner if the analog broadcasting signals are input and converting a video sequence and a frame type into a frame type, which does not require a reference frame during decoding, if the digital broadcasting signals are input, and a recording/playing controller recording the signals output from the MPEG encoder in the recording medium along with corresponding index data and uploading and playing signals corresponding to times speed and direction of trick play from the recording medium using the index data during a play mode.

The MPEG encoder converts P frame and B frame of the digital broadcasting signals into an I frame structure.

The recording/playing controller records I frame of the digital broadcasting signals in the recording medium without any conversion and records the P frame and the B frame in the recording medium after converting them into the I frame structure through the MPEG encoder.

The recording medium corresponds to an HDD.

In another aspect of the present invention, an apparatus for recording/playing a moving picture in a digital broadcast receiver includes an analog tuner receiving analog broadcasting and digitalizing the analog broadcasting, a digital tuner receiving digital broadcasting, an HDD recording analog broadcasting signals or digital broadcasting signals, an MPEG encoder MPEG-encoding the digitalized analog signals if the analog broadcasting signals are input and converting P frame and B frame into an I frame structure through MPEG-encoding if the digital broadcasting signals are input, and a recording/playing controller recording I frame in the HDD along with corresponding frame index data without any conversion if the digital broadcasting signals are recorded in the HDD, recording the P frame and the B frame in the HDD along with corresponding frame index data after converting them into the I frame structure through the MPEG encoder, and uploading and playing I frame corresponding to times speed and direction of trick play from the HDD using the frame index data during a play mode.

The recording/playing controller further includes an MPEG decoder that decodes either the broadcasting signals received through the digital tuner and the analog tuner or the broadcasting signals recorded in the HDD, wherein the P frame and the B frame to be recorded in the HDD are output to the MPEG encoder and converted into the I frame structure after being recovered to perfect video through the MPEG decoder.

The recording/playing controller divides the HDD into a normal play memory area and a trick play memory area, wherein the I, P, and B frames output through the digital tuner are recorded in the normal play memory area without any conversion and the I, P, and B frames output through the digital tuner are recorded in the trick play memory area after being converted into an I frame structure of a high compression rate through the MPEG encoder.

In other aspect of the present invention, a method for recording/playing a moving picture in a digital broadcast receiver includes a) recording P frame and B frame of digital broadcasting signals in a recording medium along with original I frame and corresponding frame index data after converting the P frame and the B frame into an I frame structure during a recording mode, and b) uploading and playing I frame corresponding to times speed and direction of trick play from the recording medium using the frame index data of video data recorded in the recording medium during a play mode.

The step a) includes recording the I frame of the digital broadcasting signals in the recording medium along with corresponding frame index data, recovering the P frame and the B frame of the digital broadcasting signals to perfect video through MPEG decoding, and recording the P frame and the B frame recovered to the perfect video in the recording medium along with corresponding frame index data after converting them into the I frame structure through MPEG-encoding.

In the present invention, since corresponding I frame is directly uploaded and played in accordance with times speed of trick play using the frame index of the video data recorded after being converted into the I frame, it is possible to normally provide forward trick play or reverse trick play for every times speed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates several examples of trick play according to the preferred embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Generally, in a digital broadcast receiver provided with a PVR, if a moving picture of digital broadcasting is recorded in a recording medium such as HDD, an MPEG encoder is not operated.

Accordingly, in the present invention, when video data of digital broadcasting are recorded in a recording medium, a sequence structure and a frame type (picture type) of the video data are converted using the MPEG encoder. The recorded video data are played using corresponding index data so as to support an elaborate trick mode when the PVR is played.

Figure 1:
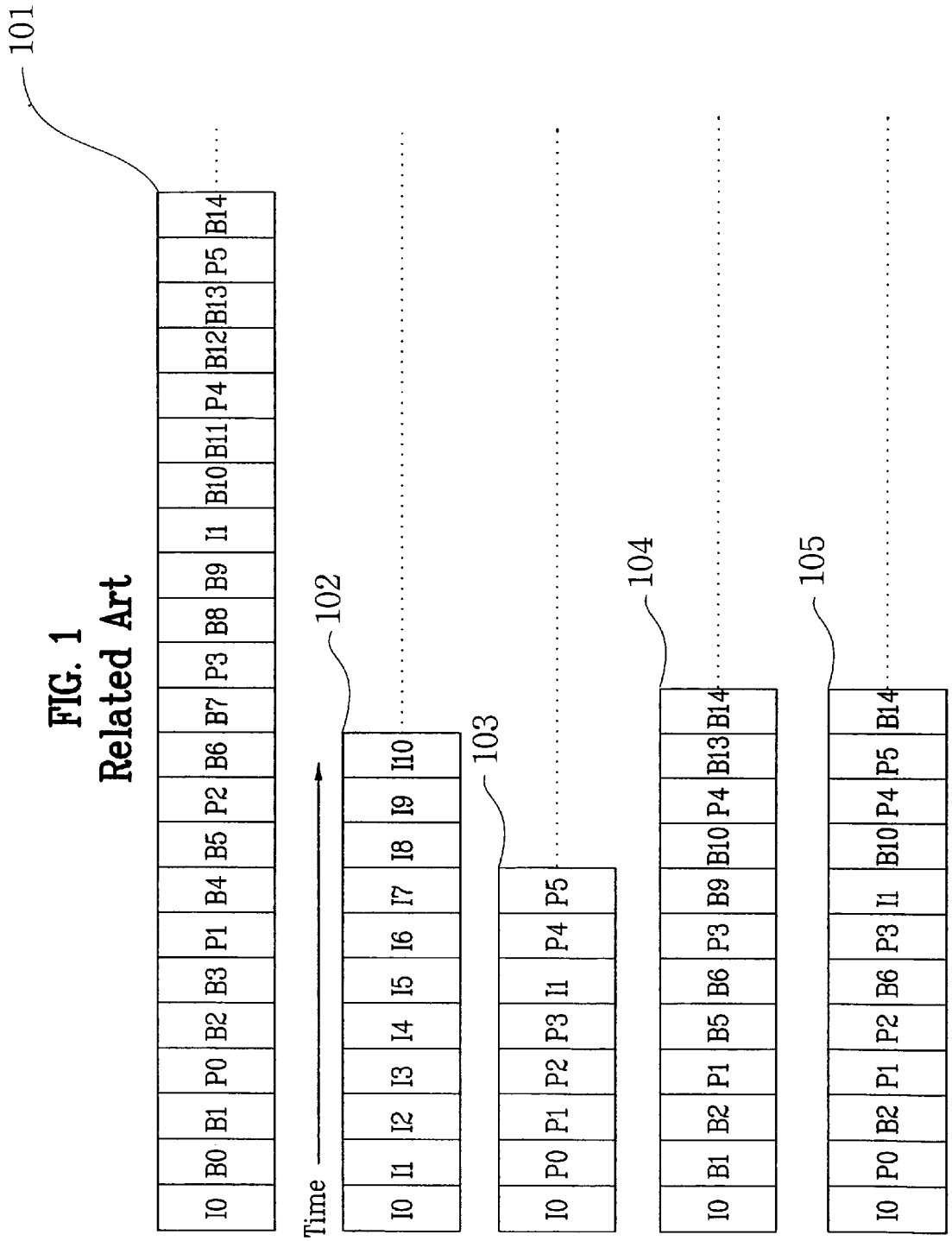
FIG. 1 illustrates several examples of related art forward trick play.
Figure 2:
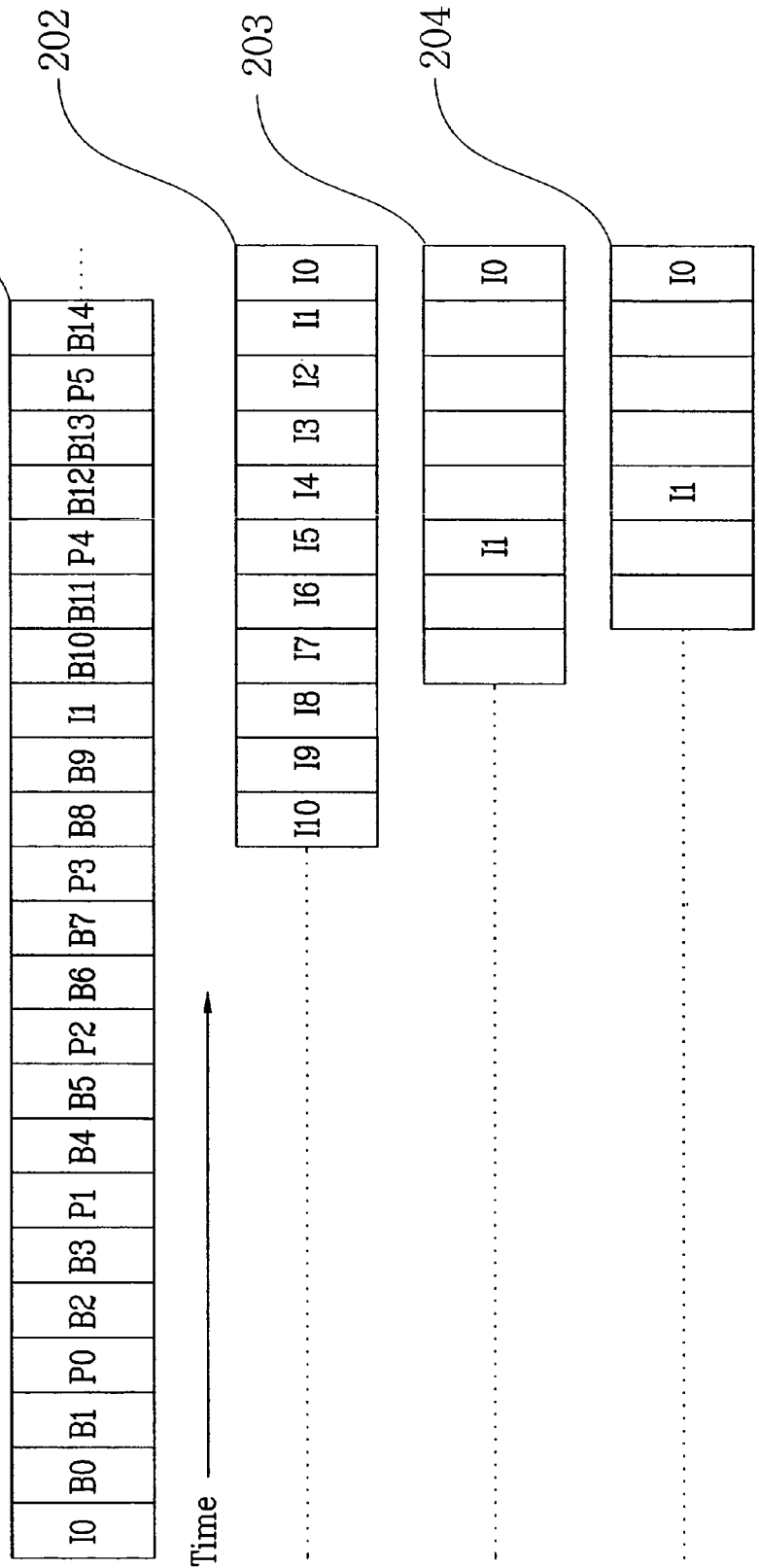
FIG. 2 illustrates several examples of related art reverse trick play.
Figure 3:
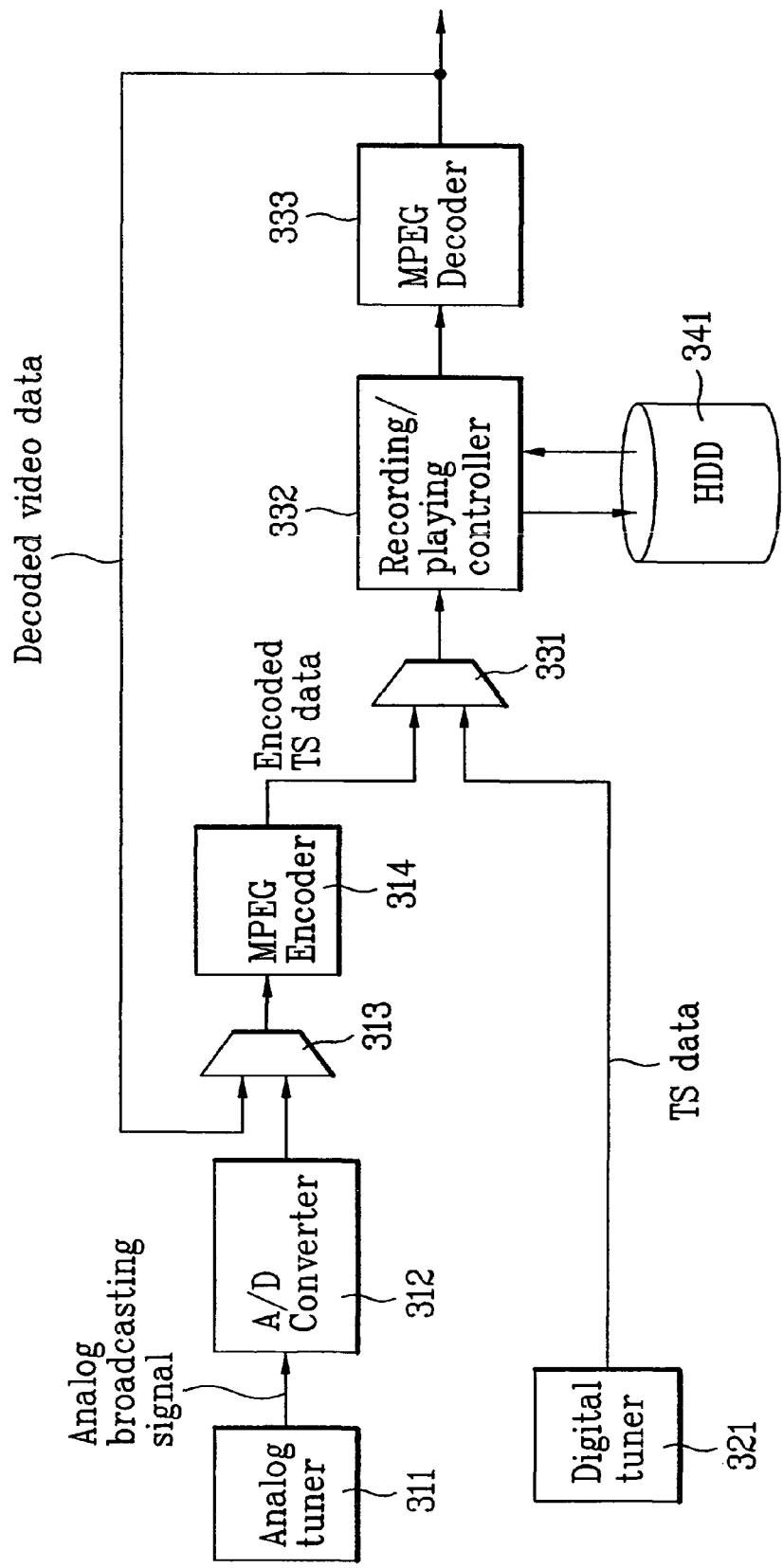
FIG. 3 is a block diagram illustrating an apparatus for recording/playing a moving picture in a digital broadcast receiver according to the preferred embodiment of the present invention.

FIG. 3 is a block diagram illustrating an apparatus for recording/playing a moving picture in a digital broadcast receiver according to the preferred embodiment of the present invention. Referring to FIG. 3, the digital broadcast receiver receives both analog broadcasting and digital broadcasting and records and plays analog and digital broadcasting data.

The digital broadcast receiver includes an analog tuner 311 receiving analog broadcasting, an analog-to-digital (A/D) converter 312 digitalizing the analog broadcasting received by the analog tuner 311, a first selector 313 selectively outputting the analog broadcasting digitalized by the A/D converter 312 or feedback digital broadcasting, and an MPEG encoder 314 converting the broadcasting signal output from the first selector 313 into digital data in an MPEG compression manner.

The digital broadcast receiver further includes a digital tuner 321 receiving digital broadcasting, a second selector 331 selectively outputting the output of the MPEG encoder 314 or the output of the digital tuner 321, a recording/playing controller 332 controlling recording the data output from the second selector 331 in an HDD 341 and playing the data recorded in the HDD 341, and an MPEG decoder 333 MPEG-decoding the data output from the recording/playing controller 332 and outputting the decoded data.

In case of analog broadcasting according to the present invention, since audio and video signals are not digital data, the analog data should be converted into digital data so that the input analog broadcasting data can be recorded in the HDD and played.

In other words, analog broadcasting of a specific channel tuned through the analog tuner 311 is digitalized by the A/D converter 312 to obtain a signal that can be recorded in the HDD 341. Then, the digitalized analog broadcasting is output to the MPEG encoder 314 through the first selector 313.

The MPEG encoder 314 encodes the digitalized analog broadcasting in an MPEG compression manner and converts the encoded data into a data format of digital broadcasting.

The MPEG encoder 314 includes an audio encoder, a video encoder, and a transport multiplexer (mux). The data output from the MPEG encoder 314 is a transport stream (TS) format.

The analog broadcasting encoded in an MPEG compression manner by the MPEG encoder 314 is recorded in the HDD 341 through the recording/playing controller 332 and then played in the same manner as the digital broadcasting.

If a program to be recorded in the HDD 341 is digital broadcasting, the MPEG encoder 314 does not need to be operated in the related art.

In the present invention, if the digital broadcasting is recorded in the HDD 341 to naturally and desirably provide trick play of several times speed, a structure of a video sequence and a frame type are converted using the MPEG encoder 314 and then the converted data are recorded in the HDD 341. In other words, I frame is recorded in the HDD 341 without any conversion while P frame or B frame is converted into I frame using the MPEG encoder 314 and then recorded in the HDD 341.

Therefore, the data recorded in the HDD 341 include only I frame. At this time, index data that includes information on the position where the data are recorded in the HDD 341 and information on a frame rate are extracted. The index data are recorded in the HDD 341 along with the I frame data.

In other words, in case of digital broadcasting, the data are input to the recording/playing controller 332 through the digital tuner 321 and the second selector 331 in a TS data format.

The recording/playing controller 332 records the input data in the HDD 341 if the frame type of the input data is I frame. On the other hand, the recording/playing controller 332 does not record the input data in the HDD 341 but outputs the input data to the MPEG decoder 333 to recover the original video if the frame type of the input data is P frame or B frame.

At this time, in case of a recording and viewing mode in which recording and viewing are simultaneously executed, the I frame is also input to the MPEG decoder 333 to recover its original video. The I, P and B frames recovered by the MPEG decoder 333 are sequentially output to a display device. At the same time, the P and B frames recovered by the MPEG decoder 333 are input to the MPEG encoder 314 through the first selector 313.

In case of a recording mode only, the P and B frames are only recovered to their original video by the MPEG decoder 333 and then output to the MPEG encoder 314.

The MPEG encoder 314 executes MPEG-encoding for the P frame or the B frame recovered to its original video so as to obtain an I frame structure. Then, the MPEG-encoded data are output to the recording/playing controller 332 through the second selector 331 in a TS data format. The recording/playing controller 332 records the P and B frames, which are converted into the I frame structure, in the HDD 341. Examples of the TS data recorded in the HDD 341 include broadcasting information guide, channel information, video data, and audio data.

The recording/playing controller 332 extracts a corresponding frame index and records the frame index in the HDD 341 when recording the original I frame and new I frames MPEG-encoded from the P or B frame in the HDD 341. The frame index is referred to during playing operation and includes information on the position where each frame is recorded in the HDD and information on a frame rate.

Meanwhile, if a play command is input, the recording/playing controller 332 uploads a corresponding I frame in accordance with times speed of trick play using the frame index of the video data converted into I frame and recorded. The MPEG decoder 333 decodes and displays the uploaded I frame so as to enable forward trick play or reverse trick play for every times speed.

The MPEG decoder 333 includes a system decoder that decodes a transport stream, a video decoder, and an audio decoder.

The video and audio data recovered by the MPEG decoder 333 are respectively output through a display device and a speaker. In case of trick play, audio data are processed in a mute.

Next, trick play according to the present invention will be described with reference to FIG. 4.

401 illustrates video data of the original digital broadcasting, and 402 illustrates video data converted into I frame using the MPEG encoder 314. Referring to 402, B or P frame of B0, B1, and P0 is converted into I frame of I001, I002, and I003. 403 and 404 respectively illustrate examples of forward trick play of three times speed and reverse trick play of three times speed using the video data of 402.

In other words, in case of forward trick play of three times speed, the data of one frame are read from the video sequence recorded in the HDD 341 as shown in 402 per two frames in forward direction. The read data are recovered by the MPEG decoder 333 and then displayed, so that forward play effect of three times speed can normally be obtained. This is equally applied to forward trick play of two times speed. In case of forward trick play of two times speed, after the data of one frame are read from the video sequence per one frame, the read data are recovered by the MPEG decoder 333 and then displayed. At this time, since all the data read from the HDD 341 have an I frame structure, no reference frame is required during MPEG-decoding. Therefore, decoding may not be executed.

By contrast, in case of reverse trick play of three times speed, the data of one frame are read from the video sequence recorded in the HDD 341 as shown in 402 per two frames in reverse direction. The read data are recovered by the MPEG decoder 333 and then displayed, so that reverse play effect of three times speed can normally be obtained. In other words, B or P frame corresponding to three times speed is not MPEG-decoded, and only I frame is repeatedly played and stopped in accordance with each times speed and frame rate. In this case, a reverse trick play screen is abnormally provided. However, in the present invention, the I frame corresponding to the B or P frame is also MPEG-decoded and then displayed so that a reverse trick play screen can normally be provided.

As described above, in the present invention, after all the frames are converted into the I frame and then recorded in the HDD, they are uploaded at constant intervals in accordance with times speed and frame rate in a play mode and then decoded and displayed, so that more elaborate moving picture trick play can normally be provided.

Meanwhile, in one embodiment of the present invention, the I frame of the digital broadcasting is directly recorded in the HDD 341, and the B or P frame is converted into the I frame through the MPEG decoder 333 and the MPEG encoder 314 and then recorded in the HDD 341.

In another embodiment of the present invention, the I frame of the digital broadcasting is not directly recorded in the HDD 341 but decoded by the MPEG decoder 333 and bypassed by the MPEG encoder 314 in the same manner as the B or P frame. Then, the I frame is recorded in the HDD 341 along with the B or P frame converted into the I frame.

Furthermore, in other embodiment of the present invention, the HDD is divided into a normal play memory area and a trick play memory area. TS data of the I, P and B frames output through the digital tuner 321 are recorded in the normal play memory area without any conversion. The I frame is recorded in the trick play memory area without any conversion but the B and P frames are converted into the I frame of a high compression rate by the MPEG encoder 314 and then recorded in the trick play memory area. At this time, since trick play does not require high picture quality, the I frame may be encoded at a high compression rate by the MPEG encoder 314 and then recorded in the HDD.

Meanwhile, terminologies used in the present invention are defined considering functions in the present invention and may be changed depending on the skilled person's intention in the art or practices. Therefore, the terminologies should be defined based upon the whole description of the present invention.

In the apparatus and method for recording/playing a moving picture in a digital broadcasting receiver according to the present invention, if the digital broadcasting is recorded, the digital broadcasting is converted into the video sequence having a new format and frame type using the MPEG encoder for analog broadcasting and then recorded in the recording medium. In this case, forward trick play or reverse trick play can normally be executed using the recorded video data.

In other words, corresponding I frame is directly uploaded and played in accordance with times speed of trick play using the frame index of the video data recorded after being converted into the I frame. Thus, it is possible to normally provide more elaborate moving picture trick play for every times speed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for recording/playing a moving picture in a digital broadcast receiver, the apparatus comprising:
   a recording medium configured to record analog or digital signals;
   a frame converter configured to convert an original P frame and an original B frame of an input digital broadcasting signal into respective converted I frames; and
   a recording/playing controller configured to
      record the original P frame, the original B frame and an original I frame of the input digital broadcasting signal in a normal play memory area of the recording medium,
      record the original I frame and the converted I frames in a trick play memory area of the recording medium along with corresponding frame index data, and
      upload, from the trick play memory area, the original I frame and the converted I frames for decoding and playing according to a times speed and a direction of trick play using the frame index data during a trick play mode,
   wherein the frame converter is configured to convert the original P frame and the original B frame into the converted I frames by
      feeding back the original P frame and the original B frame to be MPEG decoded, and
      encoding the MPEG decoded original P frame and the MPEG decoded original B frame into the converted I frames through MPEG encoding by the frame converter.

2. The apparatus as claimed in claim 1, wherein the recording/playing controller is configured to
   control the original P frame and the original B frame to be converted into the converted I frames before being recorded in the trick play memory area of the recording medium.

3. The apparatus as claimed in claim 1, further comprising:
   an MPEG decoder configured to execute MPEG decoding of the original I, P, and B frames.

4. The apparatus as claimed in claim 3, wherein the original I frame is recorded in the recording medium and corresponds to data before MPEG decoding.

5. The apparatus as claimed in claim 3, wherein the original I frame is recorded in the recording medium and corresponds to data after MPEG decoding.

6. The apparatus as claimed in claim 1, wherein the recording medium corresponds to an HDD (hard disk drive).

7. An apparatus for recording/playing a moving picture in a digital broadcast receiver comprising:
   a recording medium configured to record analog or digital signals; and
   a recording/playing controller configured to
      record an original P frame, an original B frame and an original I frame of an input digital broadcast signal in a normal play memory area of the recording medium, and
      record the original I frame and converted I frames in a trick play memory area of the recording medium along with corresponding frame index data, the converted I frames being converted from the original P frame and original B frame,
   wherein a frame converter converts the original P frame and the original B frame into the converted I frames by
      feeding back the original P frame and the original B frame to be MPEG decoded, and
      encoding the MPEG decoded original P frame and the MPEG decoded original B frame into the converted I frames through MPEG encoding by the frame converter.

8. The apparatus as claimed in claim 7, wherein the recording/playing controller is configured to upload the original I frame and converted I frames recorded in the trick play memory area for decoding and playing according to a times speed and a direction of trick play using the frame index data during a trick play mode.

9. The apparatus as claimed in claim 7, wherein the frame converter comprises an MPEG encoder.

10. The apparatus as claimed in claim 9, wherein the recording/playing controller is configured to record the analog broadcasting signal in the recording medium after MPEG encoding the analog broadcasting signal through the MPEG encoder when the analog broadcasting signal is recorded in the recording medium.

11. The apparatus as claimed in claim 7, wherein the recording/playing controller is configured to divide the recording medium into the normal play memory area and the trick play memory area, the original I, P, and B frames of the original digital broadcasting signal being recorded in the normal play memory area without any conversion and the original P frame and the original B frame being recorded in the trick play memory area after being converted into the converted I frame structure, the converted I frame structure having a relatively higher compression rate than the original P and B frames.

12. The apparatus as claimed in claim 7, wherein the recording medium corresponds to an HDD (hard disk drive).

13. A method for recording/playing a moving picture in a digital broadcast receiver, the method comprising:
   receiving a digital broadcasting signal including an original I frame, an original P frame and an original B frame;
   converting the original P frame and the original B frame into respective converted I frames;
   recording the original P frame, the original B frame and the original I frame in a normal play memory area of the recording medium;
   recording the original I frame and the converted I frames in a trick play memory area of the recording medium along with corresponding frame index data; and
   uploading, from the trick play memory area, the original I frame and the converted I frames for decoding and playing according to a times speed and a direction of trick play using the frame index data during a trick play mode,
   wherein the step of converting includes
      feeding back the original P frame and the original B frame to be MPEG decoded, and
      encoding the MPEG decoded original P frame and the MPEG decoded original B frame into the converted I frames through MPEG encoding by the frame converter.

14. The method as claimed in claim 13, further comprising:
   dividing the recording medium into the normal play memory area and the trick play memory area; and
   controlling the original P frame and the original B frame to be converted into the converted I frames before being recorded in the trick play memory area of the recording medium,
   wherein the converted I frame structure has a relatively higher compression rate than the original P and B frames.

* * * * *